June 23, 1959  E. A. FUGLIE ET AL  2,891,302
METHOD FOR INSERTING WRIST PINS WITHIN PISTONS
Filed April 28, 1955
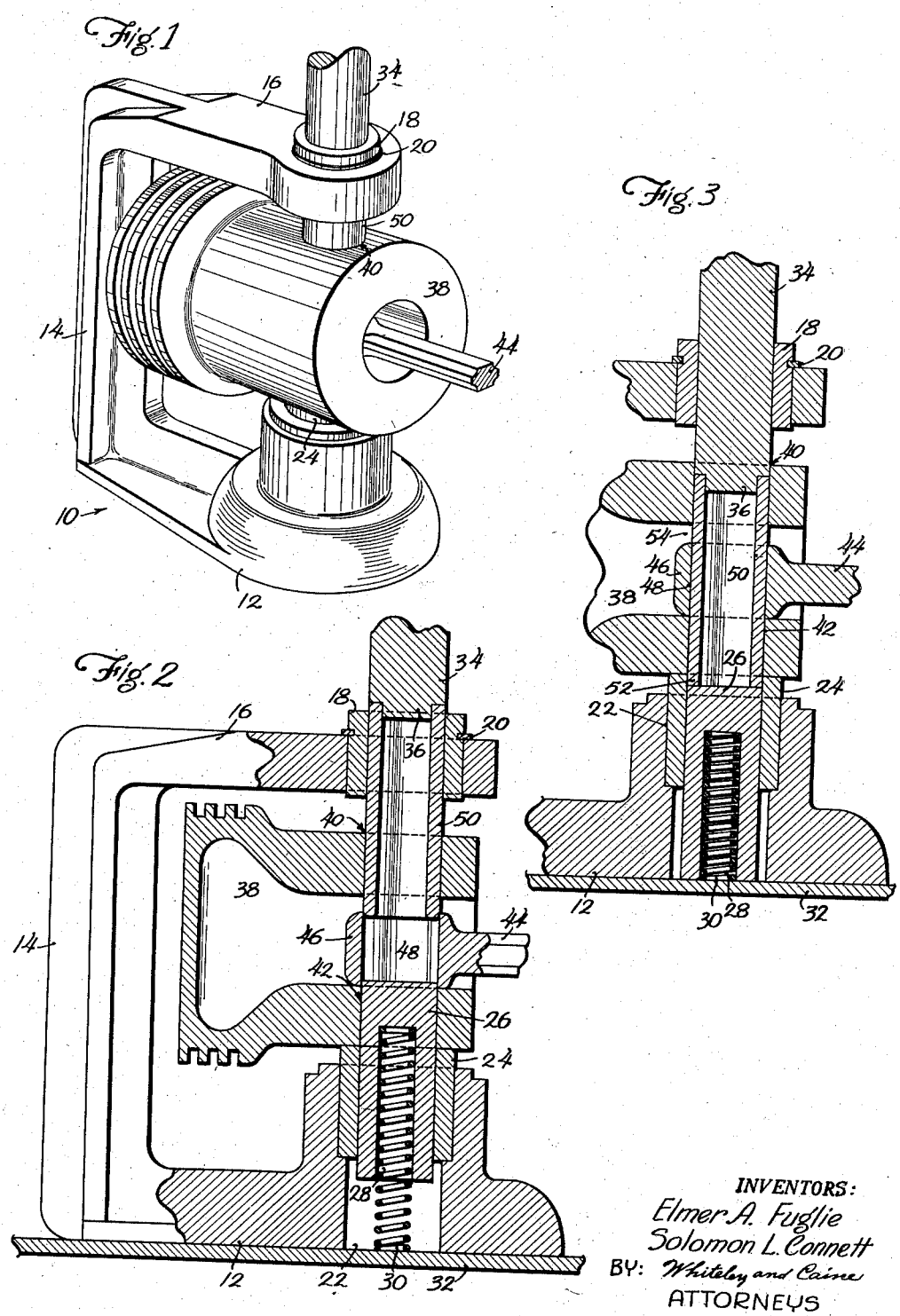
INVENTORS:
Elmer A. Fuglie
Solomon L. Connett
BY: Whiteley and Caine
ATTORNEYS

United States Patent Office 2,891,302
Patented June 23, 1959

2,891,302

METHOD FOR INSERTING WRIST PINS WITHIN PISTONS

Elmer A. Fuglie, Winona, Minn., and Solomon Leonard Connett, New Orleans, La., assignors to Winona Tool Manufacturing Company, Winona, Minn., a partnership Application April 28, 1955, Serial No. 504,582

2 Claims. (Cl. 29—149.5)

This invention relates to a method and device for inserting and/or removing a wrist pin relative to a snugly fitting connecting rod within the interior of a piston. More particularly the invention is concerned with a method and device for inserting a snugly fitting bushing or wrist pin within a connecting rod bearing in the interior of a piston in such a manner as to centrally dispose the connecting rod on the wrist pin between the opposite inner walls of the piston.

In the construction of engines in the past, the connecting rod extending from the engine crankshaft was joined to the piston by a relatively loose fitting wrist pin that could be easily inserted by hand. This arrangement allowed for a certain amount of free play between the connecting rod and the wrist pin and resulted in excessive wear of the parts. Recently the manufacturers of certain prominent classes of engines and motor vehicles have adopted engine designs providing for a very snug fit between the connecting rod bearing and the wrist pin so as to reduce wear at this part of the engine. In the present practice the diameter of the bearing on the upper end of the connecting rod is .001 less than the diameter of the wrist pin or bushing that is used for the pivotal connection between the connecting rod and the piston. With this change, it is no longer possible to insert the wrist pin by hand, and special tools are now required to connect these parts. Because of the snug fit between the wrist pin or bushing and the connecting rod bearing, it is essential that the connecting rod be centrally disposed within the interior of the piston, as otherwise the lack of alignment between the piston and the crankshaft will cause a breakage of the connecting rod.

In the present invention we have provided a form of special tool for inserting and/or removing the wrist pin and which is arranged to exactly align the connecting rod with respect to the interior of the piston so that when the wrist pin or bushing is in place, the connecting rod is assured of being centrally aligned within the interior of the piston. The essential part of the invention resides in means which provide for centrally disposing the connecting rod by the provision of a retractible member that is engaged by the pin or bushing as it passes through the bearing surfaces, and provides for a measured travel of the wrist pin or bushing for a distance to assure the central disposition of the connecting rod. The retractible member normally extends through one wall of the piston and partially into the bearing of the connecting rod to bring these parts into alignment, and this retractible member has a predetermined extent of movement when it is engaged by a pusher driven pin or bushing. The extent of movement of the retractible member is just sufficient to allow for equal spacing of the opposite sides of the connecting rod within the interior of the piston. The retractible member is spring biased to its outwardly aligning position and is movable within a supporting member when it is driven by the on-coming pin or bushing.

An object of the invention is to provide a device for inserting a snug fitting wrist pin within a connecting rod bearing disposed within the interior of a piston in such a manner as to properly space the connecting rod centrally within the interior of the piston.

Another object is to provide a method of joining a connecting rod to a snug fitting wrist pin within the interior of a piston by passing the pin consecutively through a bearing opening in the piston, the bearing opening in the connecting rod, and thence through a second opening in the piston, and limiting the movement of the pin beyond the second opening in the piston for a distance equal to one-half of the free space between the opposite sides of the connecting rod and the interior walls of the piston, and then returning the pin to flush alignment with the outer walls of the piston so as to centrally dispose the connecting rod which is now on the wrist pin within the interior of the piston.

Another object is to provide a device for inserting a snug fitting wrist pin through a connecting rod disposed within the interior of a piston which includes a supporting member and a driven member co-acting with the supporting member to hold the connecting rod in alignment with the bearing openings in the piston for the insertion of the bushing or wrist pin, and said driven member having a limited range of movement relative to the supporting member to gauge the position of the connecting rod on the pin or bushing so that it will be centrally disposed within the interior of the piston.

A further object is to provide a tool of the class described including a C-shaped supporting member having aligned openings and adapted to receive a piston, a driving member movable through one of the openings in the supporting member for driving a wrist pin through the bearing openings of the piston and a connecting rod disposed within the interior of the piston, together with a resiliently supported driven member mounted within the other opening of the supporting member which acts to hold the openings in the piston and connecting rod in alignment for passage of the wrist pin, said driven member having a limited range of movement permitting the wrist pin to extend beyond one side of the piston for a distance equal to one-half of the free space between the opposite sides of the connecting rod and the interior of the piston so that when the opposite ends of the wrist pin are aligned with the outer surfaces of the piston, the connecting rod will be centrally disposed on the wrist pin within the interior of the piston.

Other and further objects may become apparent from the following specification and claims, and in the appended drawings in which:

Fig. 1 is a perspective view of the device forming the present invention with an engine piston mounted therein, and portions of non-essential features broken away;

Fig. 2 is a side elevation partially in section of the structure shown in Fig. 1, with the wrist pin only partially extending through the piston; and, Fig. 3 is a fragmentary portion of structure shown in Fig. 2 with the wrist pin properly driven through both the piston and the connecting rod, but before the operation is entirely completed.

Having reference to the several views of the drawing, the invention will now be described in detail. General reference numeral 10 indicates a C-shaped supporting member consisting of a base portion 12, an upright portion 14, and a top portion 16. Within the top portion 16 is a hardened steel bushing 18 that is secured with the aid of a snap ring 20. Within the base portion 12 is an annular opening 22 within which is mounted a hardened steel bushing 24. Within the interior of bushing 24 is an annular retractibly driven member 26 containing a hollow opening 28 within which is secured a compression spring 30 that acts between the annular member 26 and a floor plate 32, and normally biases member 26 away from the floor plate 32. A pusher rod 34 having an outer end of reduced circumference 36 extends through bushing 18. This rod is only fragmentarily shown and would be provided with means for exerting a substantial force on the rod for driving purposes.

Within the interior of the supporting member 10 is disclosed a conventional piston 38 having aligned bearing openings 40 and 42 therein for the receipt of a wrist pin. A portion of a connecting rod indicated at 44 is provided with a head 46 through which extends a bearing opening 48. A wrist pin disclosed as a hollow bushing 50 is intended to be inserted through the bearing openings 40 and 42 of piston 38, and also through the bearing opening 48 of the connecting rod 44 to form a pivotal connection between a crankshaft, not shown, and piston 38. The rod opening 48 is about .001 under size, and therefore the fitting between wrist pin 50 and the bearing opening 48 will be very snug so as to preclude relative movement between these members, and thereby reduce frictional losses which tend to cause rapid wear on these parts.

Having reference to the several views of the drawing, the operation of the invention will now be explained. With the parts in the position shown in Fig. 2, the operation is shown during its initial stages. The piston has been mounted in supporting member 10 with bearing opening 42 surrounding the upper end of the driven member 36 and the connecting rod has been inserted into the interior of the piston, with the bearing opening 48 also located about the upper end of the driven member 26. The wrist pin or bushing 50 has been inserted through bushing 18 and also through bearing 40 through which it would readily pass. The pusher rod 34 is then brought into contact with the wrist pin by having its outer end of reduced diameter 36 extending into the interior of bushing 50. Then pressure is applied and the bushing is forcibly driven downwardly through bearing opening 40 in piston 38 and thence through the bearing opening 48 in the connecting rod 44. As pressure is continued, the outer end of bushing 50 engages the driven member 26 causing the latter member to slidably move downwardly with respect to bushing 24 and against the resilience of compression spring 30 until the lower end of member 26 is in engagement with the floor plate 32. It will be noted in Fig. 3 that when this occurs the lower end of the bushing or wrist pin 50, and here indicated at 52, has penetrated bearing opening 42 in piston 38 for a distance equal to one-half of the space between the upper side of the connecting rod head 46, and the inner surface of piston 38 adjacent the bearing opening 40. This space is indicated in Fig. 3 by reference character 54 and is exactly twice the distance of the protruding end 52 of bushing 50. When the pusher rod 34 has moved the driven member 26 against the floor plate 32, as shown in Fig. 3, the driving member 34 is retracted, and piston 38 with connecting rod 44 mounted therein is removed from the supporting member 10 and the wrist pin or bushing 50 is then moved in an opposite direction so as to bring its outer ends flush with the outer surfaces of the piston body 38. When this is accomplished the connecting rod 44 is firmly joined to the wrist pin or bushing and is equally spaced with respect to the bearing openings 40, 42 so as to be centrally disposed within the interior of piston 38.

The removal of the wrist pin or bushing 50 is a comparatively simple operation. The movable member 26 may be removed from bushing 24, and replaced by an annular member, not shown, which merely engages the piston annularly about one end of the bushing, whereafter the driving member 34 may be used to drive the wrist pin or bushing from the piston and connecting rod.

It will be obvious to those skilled in the art that our invention may be modified by many substitutions and equivalents, and this disclosure is intended to be illustrative only. Therefore, we intend to be limited solely by the scope of the appended claims.

We claim:
1. A method of centrally disposing a connecting rod within the interior of a piston on a snugly fitting wrist pin, comprising supporting said piston and connecting rod with the openings therein in alignment with each other, passing a wrist pin consecutively through one opening in the piston and thence in snugly fitting relationship through the bearing opening in the connecting rod while maintaining the openings in said piston and connecting rod in alignment with each other, thereafter passing the leading end of said wrist pin into the second bearing opening in the piston and beyond the outer limits of said second opening, limiting the extent of movement of the wrist pin beyond the second opening of the piston for a distance equal to one-half of the free space between the sides of the connecting rod and the opposite interior walls of the piston, and thereafter returning the wrist pins within the bearing openings of the piston until its opposite ends are flush with the outer surfaces of the piston to thereby centrally dispose the connecting rod within the interior of the piston.

2. A method of joining a snugly fitting wrist pin to a connecting rod within a hollow piston whose interior diameter is greater than that of said connecting rod, embodying supporting said piston and connecting rod with the bearing openings therein in alignment with each other, passing said wrist pin through said bearing openings, the improvement consisting of the steps of passing the leading end of said wrist pin beyond the outer limits of the second bearing opening in said piston, limiting the extent of movement of the leading end of the wrist pin beyond the second bearing opening of the piston for a distance equal to one-half of the free space between the sides of the connecting rod and the opposite interior walls of the piston, and thereafter reversely moving the wrist pin within the bearing openings of the piston until its opposite ends are flush with the outer surfaces of the piston and thereby disposing the connecting rod centrally within the interior of the piston.

References Cited in the file of this patent

UNITED STATES PATENTS

| | | |
|---|---|---|
| 1,272,176 | Alexander | July 9, 1918 |
| 1,810,884 | Minor | June 16, 1931 |
| 1,887,168 | Rauberstrauch | Nov. 8, 1932 |
| 2,446,515 | Weingart | Aug. 3, 1948 |
| 2,497,498 | Hamilton | Feb. 14, 1950 |
| 2,586,222 | Hamilton | Feb. 19, 1952 |

FOREIGN PATENTS

| | | |
|---|---|---|
| 311,712 | Germany | Apr. 7, 1919 |